United States Patent [19]

Fuller et al.

[11] Patent Number: 5,073,354

[45] Date of Patent: Dec. 17, 1991

[54] PROCESS OF STRIPPING GOLD AND SILVER FROM CARBON

[75] Inventors: Everett J. Fuller, Gillette, N.J.; Lionel B. Luttinger, Erwinna, Pa.; Mark G. Lang, Passaic, N.J.

[73] Assignee: Drew Chemical Corporation, Boonton, N.J.

[21] Appl. No.: 588,247

[22] Filed: Sep. 26, 1990

[51] Int. Cl.$^5$ .............................................. C22B 3/42
[52] U.S. Cl. ............................. 423/24; 423/DIG. 14
[58] Field of Search ......................... 423/24, DIG. 14

[56] References Cited

U.S. PATENT DOCUMENTS 4,433,151  2/1984  Hiratani ................................. 423/24
4,500,396  2/1985  Agostino et al. ..................... 423/24

Primary Examiner—Melvyn J. Andrews
Attorney, Agent, or Firm—Walter H. Schneider

[57] ABSTRACT

Gold and silver are stripped from activated carbon on which they are adsorbed as cyanide complexes by subjecting the activated carbon to a stripping solution comprising as the strippant an effective amount of a compound containing the carboxylate functionality. The compound is preferably selected from benzoic and substituted benzoic acids, and polyacrylic acids of less than about 100,000 m.w.

11 Claims, 2 Drawing Sheets

PROCESS OF STRIPPING GOLD AND SILVER FROM CARBON

BACKGROUND OF THE INVENTION

1. Field of the Invention

The present invention relates generally to the separation of gold and silver from ores. More particularly, the present invention relates to the separation of gold and silver from ores by the method of heap leaching in which the precious metal values are recovered as cyanide complexes which are then separated from solution by adsorption on activated carbon. Still more particularly, the present invention relates to an improved method of carbon desorption in which metal cyanide complexes are removed from the activated carbon.

2. Description of the Prior Art

The recovery of gold and silver by the process of heap-leaching is well known. In general, the procedure comprises spraying, trickling, pouring on, or otherwise applying to a pile of low grade ore or tailings an aqueous alkali cyanide solution, e.g., aqueous calcium, sodium or potassium cyanide, so as to cause the solution to permeate and percolate through the pile thereby extracting the gold and silver as cyanide complexes. The resultant cyanide complex pregnant liquor is recovered from the bottom of the pile, of which there is usually a series in an extraction facility, and routed to a recovery system. A recent improvement designed to increase the efficacy of the heap-leach procedure comprising the incorporation in the leach solution of any of various hydrolyzable surfactants has been disclosed in U.S. Pat. No. 4,929,274 of Lionel B. Luttinger, one of the inventors of the invention of this application.

The cyanide complexes obtained from the ore by heap-leaching are separated from the pregnant liquor by adsorption on activated carbon in pulp (CIP) or activated carbon in column (CIC), after which the resultant loaded carbon is subjected to stripping. Stripping is the process of carbon desorption by which the metal cyanide complexes are put into solution. The gold and silver values then being recovered from the solution by electrowinning or by zinc precipitation.

Two types of strip circuits are presently employed. One is known as a "Zadra" strip and the other as an "AARL" strip. In both types, an aqueous barren strip solution of sodium cyanide and caustic soda, heated to 180°-300° F., is passed through the loaded carbon in a strip column or vessel. The heated solution desorbs or "strips" the gold and silver cyanide complexes from the carbon which are then recovered from solution as above discussed. In the "Zadra" strip, the strip solution is continuously recirculated until the maximum or optimum recovery of gold and silver from the carbon is effected. In the "AARL" strip, the strip solution is not recirculated. This latter described strip therefore, is a once-through process.

Sodium cyanide is unstable in caustic solution at elevated temperatures and breaks down to form ammonia gas. This reaction necessitates a constant makeup of cyanide to the barren solution of a strip circuit in order to maintain its efficiency. Approximately 20% of the cyanide expense of a typical strip circuit is the result of cyanide loss due to its instability which is of particular significance since cyanide is currently in short supply. Sodium cyanide, moreover, is a deadly environmental hazard.

It has been proposed to modify the caustic-cyanide strip solution by eliminating the cyanide from the solution. In current practice, however, the metal complex-bearing carbon is preferably first subjected to an acid pre-soak step in order to remove calcium carbonate and other substances from the carbon pores. Because acid presoak followed by contacting with a non-cyanide strip solution can irreversibly fix much of the gold and silver content on the carbon with no possibility of stripping except with a caustic-cyanide solution, the use of a cyanide-free strip solution has not been considered feasible so long as a pre-soak is practiced.

SUMMARY OF THE INVENTION

There has continued to remain, therefore, a demand for improving the strip circuit employed in the cyanide heap-leaching of gold and silver ores. It is a principal object of this invention to provide such an improvement. It is a further object of this invention to provide a circuit for stripping gold and silver cyanide complexes adsorbed on activated carbon from a pregnant heap-leach liquor without the use of a caustic-cyanide strip solution. It is still a further object of this invention to provide an improved strip circuit for use in the cyanide heap-leaching of gold and silver ores by eliminating the strip solution containing unstable, expensive and environmentally unacceptable sodium cyanide and replacing it with an economically superior and environmentally acceptable strip solution containing inexpensive, stable and highly effective chemicals.

These various objects have been met in acordance with this invention by replacing the sodium cyanide of the conventional caustic-cyanide strip solution with certain compounds capable of providing the carboxylate functionality (COO—). In accordance with the present invention, stripping of the metal cyanide complexes adsorbed on the carbon is effective whether or not the complex-bearing carbon has been first subjected to an acid wash.

DESCRIPTION OF THE PREFERRED EMBODIMENT

Figure 1:
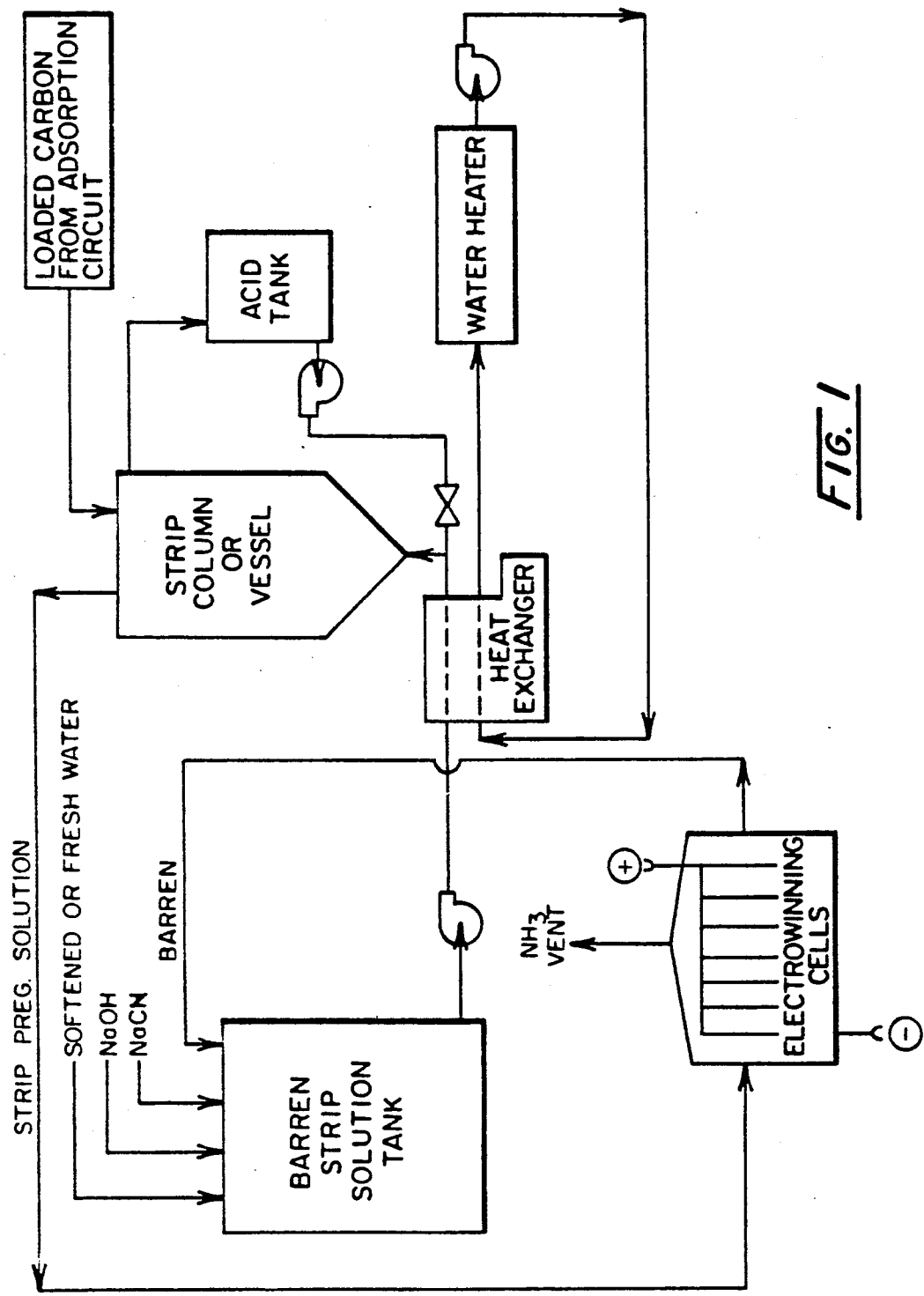
FIG. 1 is a flowsheet of a typical recirculating, or "Zadra", type strip circuit for stripping gold and silver cyanide complexes adsorbed on activated carbon from a pregnant caustic-cyanide heap leach liquor.

Turning to the drawings, FIG. 1 illustrates the components and flow directions of a conventional recirculating circuit for stripping gold and silver cyanide complexes adsorbed on activated carbon. A barren strip solution, comprising fresh or softened water and a strippant comprising a mixture of sodium cyanide and caustic soda, is made up in a barren strip solution tank, heated by heat exchanger to 180°-300° F., and then passed through metal cyanide-complex loaded carbon in the strip column or vessel. Current practice is to subject the loaded carbon to an acid pre-soak step to remove from the carbon pores scale-forming calcium carbonate and other impurities introduced into the circuit with the water make-up and with the carbon itself. The extent of the acid treatment may vary from a room temperature soak in dilute acid to boiling the loaded carbon in stronger acid, e.g., 5-10% HCl.

The heated solution desorbs or "strips" the gold from the carbon in the strip column and passes it on to an electrowinning cell. In the electrowinning cell, a DC current is connected through a cathode wrapped with steel wool and an anode of mild or stainless steel. The gold and silver are precipitated on the steel wool forming a "cathode product or precipitate". Ammonia formed in the circuit by breakdown of the sodium cyanide is vented from the electrowinning cell.

Barren solution from the electrowinning cell is recycled to the barren strip solution tank, as indicated, and the procedure continued until the optimum removal of gold and silver from the carbon is attained. The barren carbon is then removed from the strip column and a new batch introduced. In a non-recirculating or once-through strip circuit, the barren strip solution is held in the strip vessel for approximately an hour before being passed on to the electrowinning cell. Barren solution from the electrowinning cell is not recirculated but is removed from the circuit and replaced by a fresh batch of strip solution.

In accordance with the present invention, the strip circuit of FIG. 1 is modified by eliminating the sodium cyanide of the barren strip solution and replacing it with a compound containing the carboxylate functionality. As a source of the carboxylate functionality, it has been observed that (a) benzoic and substituted benzoic acids, especially benzoic and salicylic acids, and (b) polyacrylic acids of less than 100,000 m.w., preferably 1000–3000 m.w., are highly efficacious in stripping gold from carbon. It has been further observed, moreover, that a certain degree of synergism is surprisingly exhibited when using a combination of compounds (a) and (b).

As with the sodium cyanide strippant of a conventional stripping solution, the carboxylate strippant of this invention may be used with caustic soda which is usually present up to 2.0% by weight of the solution. The strippant of this invention will be used, when expressed in terms of molar concentration, in a range of about 0.001–2.0M, preferably about 0.005–0.8M. When expressed in terms of weight percent, the strippant will be used in a range of about 0.01–25% by weight of the stripping solution, preferably about 0.1–10% by weight.

The stripping solution containing a strippant according to this invention may be used in a recirculating circuit or in a once-through circuit at atmospheric or elevated presssures and at ambient or elevated temperatures. The improved process of this invention, moreover, may be practiced with equal efficiency whether or not the metal-loaded carbon has been first subjected to an acid pre-wash. This is particularly surprising in view of the current belief that acid pre-washed carbon must subsequently be stripped with a cyanide-bearing stripping solution for effective stripping.

The present invention is further illustrated by the following examples in which all parts are by weight unless otherwise noted. All stripping solutions contained 2.0% NaOH. A stripping solution containing only 2.0% NaOH was tested as a blank. A conventional cyanide strip solution was also tested for comparative purposes.

EXAMPLE 1

Figure 2:
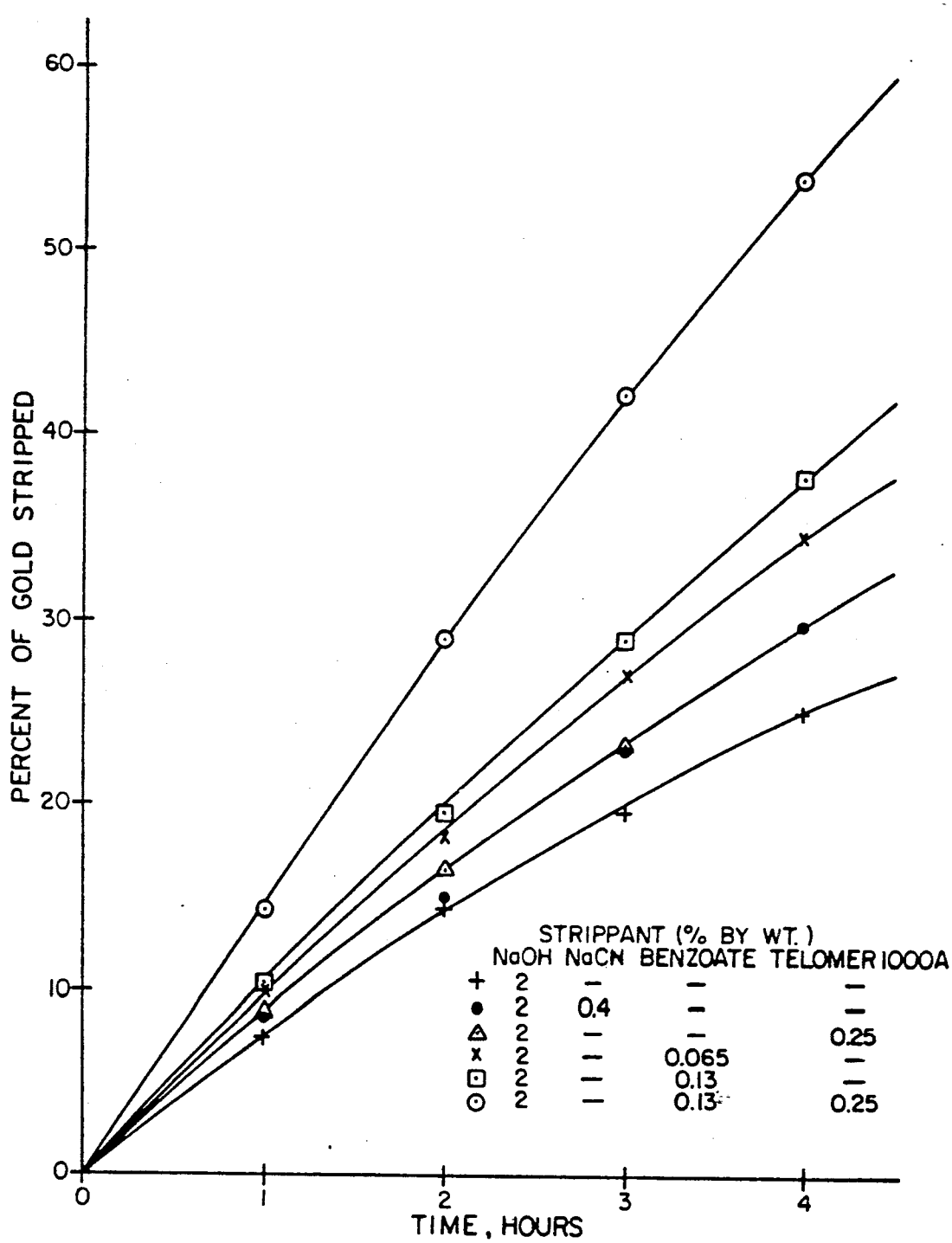
FIG. 2 is a graphical representation of the data tabulated in Table 1 as derived from the procedure described in Example 1.

20 gram samples of acid pre-washed loaded carbon each containing 55.93 mg. of gold present in the form of a gold cyanide complex were each added to 500 ml. samples of strip solutions each containing a strippant according to Table I. Each of the resultant test samples was magnetically stirred at 80° C. After approximately one hour, which was the point at which maximum gold concentration was achieved, 475 ml. of solution were drawn off from each test sample and replaced by the same amount of fresh, hot solution. The drawn-off solutions were analyzed for gold content. One hour draw-off times were maintained throughout the testing which lasted four hours. Data from the testing appear in Table I and graphically in FIG. 2 of the drawings.

TABLE I

| NaOH | NaCN | Strippant (% by wt) Benzoate | Telomer 1000A* | Gold Stripped (% by wt) 1 hr | 2 hr | 3 hr | 4 hr |
|---|---|---|---|---|---|---|---|
| 2.0 | | | | 7.6 | 14.5 | 19.7 | 25.1 |
| 2.0 | 0.4 | | | 8.8 | 15.0 | 23.2 | 29.9 |
| 2.0 | | 0.065 | | 9.9 | 18.4 | 27.2 | 34.5 |
| 2.0 | | | 0.25 | 9.0 | 16.6 | 23.4 | |
| 2.0 | | 0.13 | | 10.4 | 19.6 | 29.1 | 37.9 |
| 2.0 | | 0.13 | 0.25 | 14.3 | 29.1 | 42.3 | 54.0 |

*Polyacrylic acid (50% active and 1000 MW) available under the Telomer trademark from the Telomer Corporation of Houston, Tx.

The above data illustrate the approximate equivalent stripping action of the polyacrylic acid and the superior stripping action of the benzoate to that of the conventional cyanide strippant. The surprising and unexpected synergism of a combination of the strippants according to this invention is illustrated by the last three tests.

EXAMPLE 2

The procedure of Example 1 was repeated except that the gold sample contained 59.92 mg. gold as a gold cyanide complex, and salicylic acid was used as the strippant. Results appear in Table II.

TABLE II

| NaOH | Strippant (% by wt) Salicylic Acid* | Gold Stripped (% by wt) 1 hr | 2 hr | 3 hr | 4 hr |
|---|---|---|---|---|---|
| 2.0 | 0.25 | 18.7 | 31.0 | 43.1 | 52.2 |

*Fisher certified ACS salicylic acid

EXAMPLE 3

To illustrate that the strippants of this invention are effective in stripping silver as well as gold, the procedure of Example 1 was repeated except that there was no acid pre-wash. Newmont carbon samples were used having an assumed gold content of 138.8 mg. but an unknown, if any, silver content. Both benzoate, according to this invention, and the prior art cyanide, were used as strippants, the latter being a known silver as well as a gold strippant. The results after the first hour appear in Table III.

TABLE III

| NaOH | Strippant (% by wt) NaCN | Benzoate | Gold Stripping (ppm) | Silver Solu. Conc. (ppm) |
|---|---|---|---|---|
| 2.0 | | 0.13 | 16.56 | 0.654 |
| 2.0 | 0.4 | | 13.29 | 1.07 |

The data of Table III show the stripping of silver by cyanide, a known silver strippant, thereby establishing that the Newmont carbon of Example 3 contains adsorbed silver as well as gold. The data further show that silver is stripped by the use of benzoate as a strippant, further establishing that the strippants according to this invention are effective in stripping silver as well as gold from carbon on which they are adsorbed as cyanide complexes.

We claim:

1. A process for stripping a metal value selected from gold and silver from activated carbon on which said metal value is adsorbed as a metal cyanide complex which comprises: subjecting said metal cyanide complex-adsorbed carbon to an aqueous solution of a compound selected from (a) benzoic acid and substituted benzoic acids and (b) polyacrylic acids of less than about 100,000 molecular weight, the concentration of said compound being effective to strip adsorbed metal cyanide complex from said carbon.

2. A process according to claim 1 in which the compound is present in a molar concentration of about 0.001–2.0M.

3. A process according to claim 2 in which the compound is benzoic acid.

4. A process according to claim 2 in which the compound is polyacrylic acid of about 1000–3000 m.w.

5. A process according to claim 2 in which the compound is a combination of benzoic acid or substituted benzoic acid and a polyacrylic acid of less than about 100,000 m.w.

6. In a process for recovering a metal value selected from gold and silver in which an ore is leached with an alkaline cyanide leach solution to form a pregnant leach solution containing the metal value as a metal cyanide complex; said metal cyanide complex is separated from the pregnant leach solution by adsorption on activated carbon; said metal cyanide complex-adsorbed carbon is subjected to an aqueous stripping solution comprising a strippant to desorb said metal cyanide complex and place it in solution, and the metal value is recovered from the dissolved metal cyanide complex, the improvement in which the strippant in said aqueous stripping solution is a compound selected from (a) benzoic acid and substituted benzoic acids and (b) polyacrylic acids of less than about 100,000 molecular weight, the concentration of said compound being effective to strip adsorbed metal cyanide complex from said carbon.

7. The improvement according to claim 6 in which the compound is present in a molar concentration of about 0.001–2.0M.

8. The improvement according to claim 7 in which the compound is benzoic acid.

9. The improvement according to claim 7 in which the compound is polyacrylic acid of about 1000–3000 m.w.

10. The improvement according to claim 7 in which the compound is a combination of benzoic or substituted benzoic acid and a polyacrylic acid of less than about 100,000 m.w.

11. The improvement according to claim 6 in which the metal cyanide complex-adsorbed carbon is subjected to an acid pre-wash before being subjected to said aqueous stripping solution.

* * * * *